Figure 1:
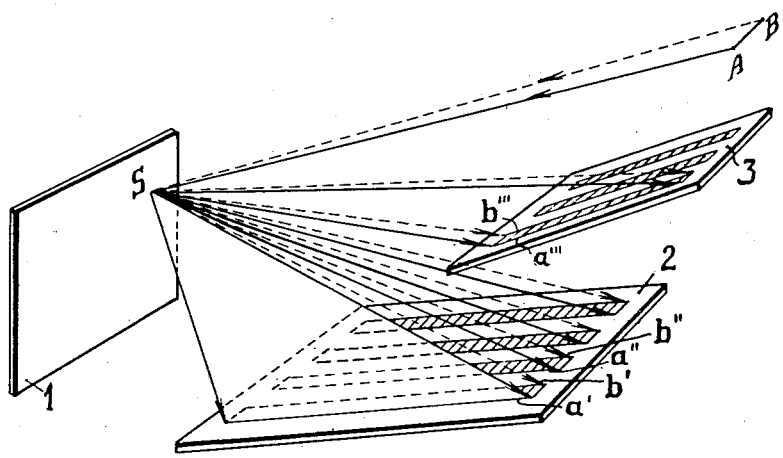

June 13, 1944.    D. GABOR    2,351,033
SYSTEM OF PROJECTING PICTURES IN STEREOSCOPIC RELIEF
Filed Aug. 3, 1940    6 Sheets-Sheet 1

Inventor
Dennis Gabor
By
Stone, Boyden & Mack
Attorneys

June 13, 1944. D. GABOR 2,351,033
SYSTEM OF PROJECTING PICTURES IN STEREOSCOPIC RELIEF
Filed Aug. 3, 1940 6 Sheets-Sheet 2

Inventor
Dennis Gabor
By Stone, Boyden & Mack
Attorneys

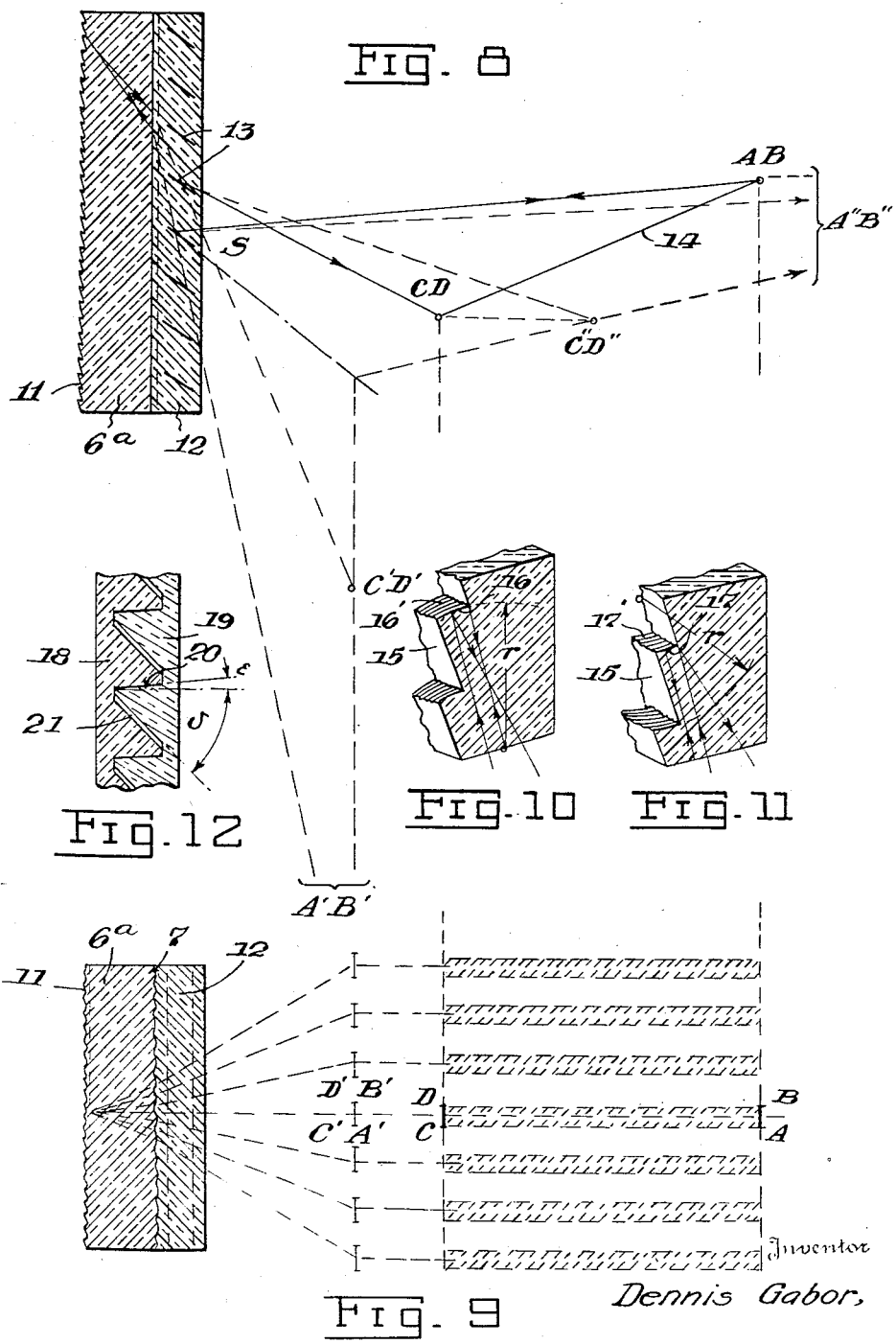

June 13, 1944.  D. GABOR  2,351,033
SYSTEM OF PROJECTING PICTURES IN STEREOSCOPIC RELIEF
Filed Aug. 3, 1940   6 Sheets-Sheet 4
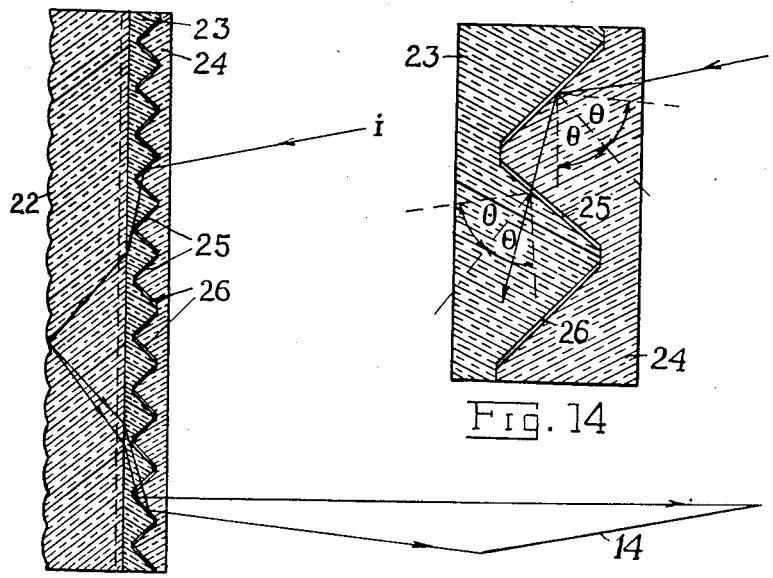
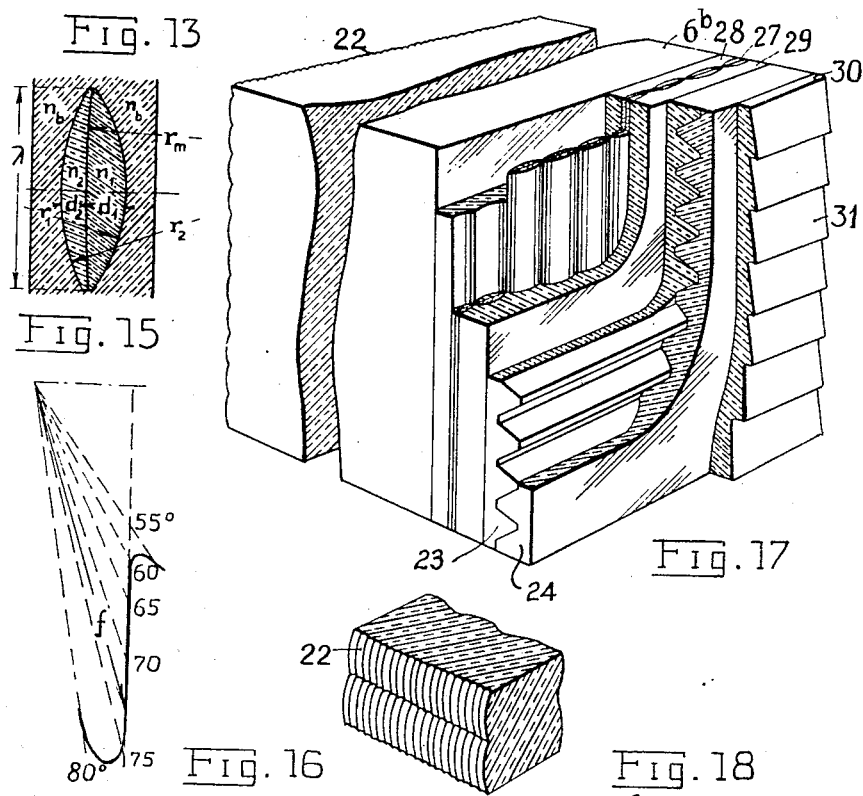
Inventor
Dennis Gabor
By Stone, Boyden & Mack
Attorneys Patented June 13, 1944

2,351,033

UNITED STATES PATENT OFFICE 2,351,033

SYSTEM OF PROJECTING PICTURES IN STEREOSCOPIC RELIEF

Dennis Gabor, Rugby, England

Application August 3, 1940, Serial No. 350,804
In Great Britain May 3, 1940

18 Claims. (Cl. 88—16.6)

This invention relates to projection systems for the production of still or motion pictures with stereoscopic effect. More particularly the invention relates to projection systems in cinema theatres, in which true spatial images may be seen from every seat in the audience without individual viewing means at or near the eyes of each observer.

Various systems have been proposed heretofore which claim to present true three dimensional images visible throughout a wide viewing angle to a large audience. I call an image "true" if its apparent spatial position is independent of the position of the observer. Stereoscopic pictures presented by means of selective spectacles with coloured or polarizing glasses or with synchronous shutters are not "true" in this sense, as points of the stereoscopic picture will appear to every observer in line with the same point of the screen, and therefore their spatial position will vary with the position of the observer.

The presentation of a single true image to every observer in a cinema theatre encounters two fundamental difficulties. First, the scene which has to be presented within a wide viewing angle has to be taken with rays embracing the same angle, and this requires either many cameras, or a camera with practically impossible dimensions of aperture. Second, every frame of the film must store an exceedingly large amount of detail, as it must contain in itself the pictures seen from many different view points, at least many hundred for ordinary cinema theatres. This is impossible with frames of reasonable size, not only with the grain size of films as obtainable at present, but also in principle, as the details would have to be finer than a wavelength of light.

In the system of the present invention this fundamental difficulty is overcome by presenting to every observer in the audience of the cinema theatre a true spatial image, but not the same true image to different observers in the audience. Every observer sees a true image so long as he does not move his eyes outside a certain zone, and this zone is made wide enough according to the invention to cover the width in which a seated person is likely to move his head. The spatial images seen by observers in different seats are however not the same, but are in the same relation to one another as in the systems using selective spectacles, viz. corresponding spatial points appear in line with the same point of the screen surface.

The projection screen according to the invention produces the whole series of true spatial images as seen by single observers by means of optical transformations out of a single true spatial image which is produced by the projector. The film used in the projector may bear a real relief, or it may be of any kind suitable for producing projected stereoscopic aerial images. Such films based on the "parallax principle" are known per se and do not form part of the invention. A particularly suitable kind of film is however described in the co-pending application Serial No. 350,803. As every one of the many true spatial images produced by the screen and seen by single observers is visible within a narrow angle only, the film need not contain much more detail in a single frame than an ordinary film.

The system of the present invention comprises in a cinema theatre a projector having an exit pupil with a horizontal extension of the order 150–350 mms. in combination with a special front projection viewing screen, said two elements being matched in a certain way with the audience, which consists of one or more planes in which the seats are arranged in columns of equal lateral spacing. The rows can be staggered in such a way that only seats in every second row form columns. The matching of the three elements, projector, screen and audience is as follows: The screen produces a multiplicity of band shaped images of the projector aperture in or near to the plane or planes in which the eyes of the members of the audience are contained when seated, said image bands having the same horizontal width as the projector aperture, and the same lateral spacing from one another as the columns of seats in the audience. Each image band registers with a column of seats. By this it is ensured that every member of the audience will see one and only one of the true spatial images produced by the screen, and no confusion can result from seeing more than one at a time so long as the observer does not move so far out of his central position that both his eyes fall outside the image band allocated to his column.

The front projection viewing screen according to the invention comprises a transparent plate, to be called base plate, fitted on its front side with an array of equally spaced vertical cylindrical lenticules, the focal surface of which coincides at least approximately with the rear face of said plate. The rear face may be made diffusely reflecting e. g. by grinding and metallizing, or it may be fitted with a network of reflecting elements which diffuse the light incident from the projector only within a prescribed solid angle. The base plate as described is suitable in itself

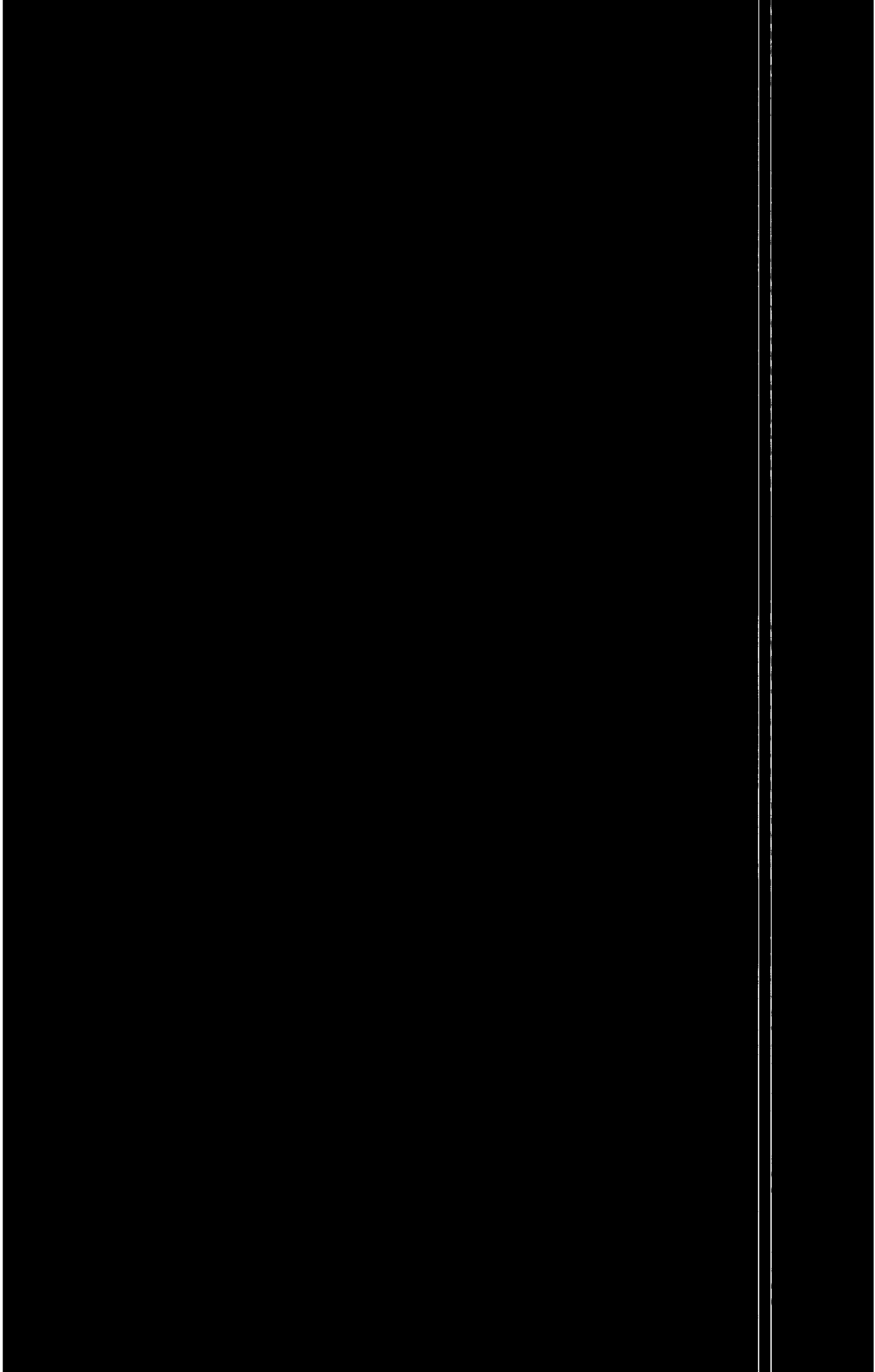

the screen into the audience need not emerge from exactly the same point S. This would be true only if the screen had zero thickness. Actually they will emerge from an area round the original point which has dimensions comparable with the thickness of the screen. This area need not have dimensions smaller than the limit of eye resolution. It suffices if those rays out of the original narrow bundle which will be finally collected in one eye form themselves a very narrow bundle, i. e. emerge from a small patch of the screen surface. But the patches corresponding to observers in different parts of the theatre may together cover a far larger area.

Figure 2:
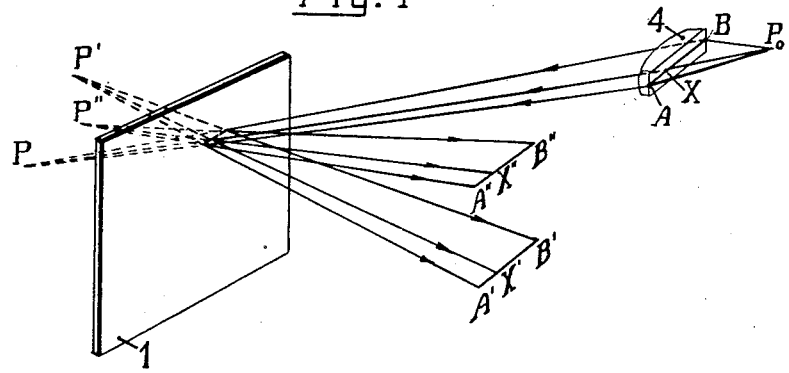
Figure 4:
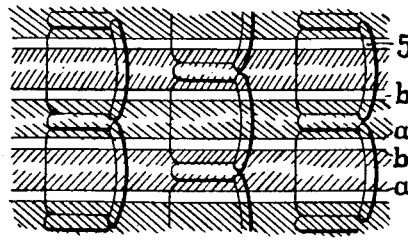

Fig. 1 contains the whole definition of the optical functions of screens according to the invention, everything else follows from it. This is demonstrated in Fig. 2. In this figure 4 is the projection lens, with an object point $P_o$. This may be e. g. a point of a film, which bears a real relief, but it is more suitable to use films which only appear in relief. Suitable films based on the so-called raster principle, and in particular on the principle of lenticular rasters invented by Lippmann are known in themselves. A special film which is particularly suitable for the purposes of my invention will be described in an application Serial Number 350,803 filed simultaneously with the present. For the purpose of explanation it is however irrelevant whether there is a real object point $P_o$, or whether it only appears to be there if seen from the lens 4. In both cases 4 will produce an image of it at P. From this we can immediately construct the images of P seen by different observers in the audience. Let A'—B' be an image of A—B, i. e. let the points A'—B' be situated on one of the lines $a$ and $b$ respectively. An observer with his eyes in the line A'—B' will see the image of P at P', whatever position X' his eyes may assume between A' and B'. P' is constructed as the intersection of the rays arriving at A' and B', prolonged backwards behind the screen. In the drawing it has been assumed that the screen has negligible thickness, so that said rays emerge from the same point of the screen surface at which the corresponding rays incident from A and B have entered it. Finite screen thickness introduces a small modification, which can be neglected for the present. A second observer whose eyes are somewhere on the line A''—B'' will see the point at P''. It is obvious from the construction that P'' will appear nearer to the screen in the same proportion as the second observer is nearer to the screen than the first observer. This effect though it manifests itself in an apparent distortion of the spatial image is not disturbing except in seats very close to the screen, or very far to the side. The lateral distortion is exactly the same as seen in the projection of flat pictures, and the foreshortening effect is the same as would appear with stereoscopic systems using selective spectacles.

Figure 3:
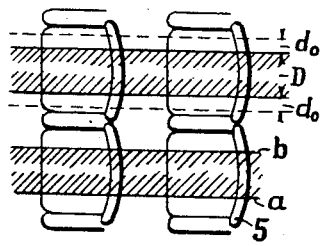

Fig. 3 shows how the zones of stereoscopic vision, i. e. the bands bounded by the lines $a$—$b$, have to be arranged with respect to the seats 5 of the cinema theatre, if the seats of consecutive rows are arranged behind one another. The width D of the zones is equal to the width of the projector aperture. So long as both eyes are inside this zone, binocular stereoscopic vision is possible. If $d_o$ is the normal eye distance—about 65 mms.—there will be a latitude of movement $D-d_o$ for seeing a stereoscopic picture and $D+d_o$ for seeing a picture at all. $D=200$ mms. ought to give sufficient freedom of head movement, provided that the vision is not obstructed by the person in the seat in front. To avoid this, consecutive rows may be staggered by one-half of the seat spacing, and the distance of consecutive zones of vision chosen also as one-half of said spacing, as shown in Fig. 4. The best results will be obtained if this spacing of the zones of vision is adopted and the rows staggered in the central block of seats, but arranged behind one another in the side blocks, as is already the practice in many theatres. We can express the rule illustrated in Figs. 3 and 4 by saying that the spacing of the zones of vision is the smallest lateral spacing of two seats in the audience.

The width D of the zones of vision has to be determined from the point of view of the comfort of the audience. It must be wide enough to prevent the feeling that a stiff position has to be maintained. On the other hand, as will be seen from Fig. 4, D can not be made wider than half the seat width, or about 250 mms. There are also other considerations to limit the size of D. One is, that with the usual focal length of projectors it becomes increasingly difficult to construct effective apertures larger than about 200 mms. Another consideration is the effect of D on the definition. If the film bears a real relief, without noticeable grain, such as is obtainable e. g. by the swelling of bichromated gelatine, this question does not arise. But with films based on the parallax principle the views seen by eyes in different positions within the width D have to be accommodated in a two dimensional film, and their number is limited by the resolving power of the film emulsion. The relation between D and the definition can be seen best if we consider image points which appear at infinity. From Fig. 2 it will become clear, that in this case the beam of the projector will strike the screen on a width D, and this is returned to the observers again in a parallel beam of the width D. On the screen surface itself the point will be resolved in a string of images of the "picture points" in the photographic emulsion, each corresponding to a view of said spatial point. The separation of the "picture points" in the photographic emulsion can not be smaller than the resolution limit of the emulsion, and on the other hand the spacing of their images on the screen must not exceed the limit of eye resolution. The definition in good cinematographic pictures is 3–400 lines per frame width, and this gives with a screen width of 600 cms. a resolution limit of 1.5–2 cms. If therefore we choose $D=20$ cms., we must have 10–13 "picture points" in the emulsion for each spatial image point. In other words, we have to store 10–13 times more picture points in one film frame than necessary to obtain the usual definition. This presents no special difficulties with present-day positive stock. A width of about $D=200$ mms. presents therefore a good compromise from all points of view.

The screen according to the invention can be used also in a somewhat different manner. Instead of a film which bears a relief, or which by a parallax effect appears in a relief, the film may be one as used ordinarily in the systems with selective spectacles. In this case when a picture for the left eyes is to be shown, the right half of the projector aperture has to be covered e. g. by a revolving shutter, and vice versa. By this the zones of vision are divided up in two halves, one for the right and one for the left eye. This system has the advantage of a simpler film, it has however the disadvantage that a somewhat rigid position of the persons in the audience is necessary. The latitude of head movement in this case is only equal to the eye distance of the observer, in the average 65 mms., and this is not enough for comfort, especially if the vision is partly obstructed by the person in front.

After having described in general optical terms the function of the screen according to the invention, I describe now in detail the dioptrical and catoptrical structures by which said function is performed.

Figure 5:
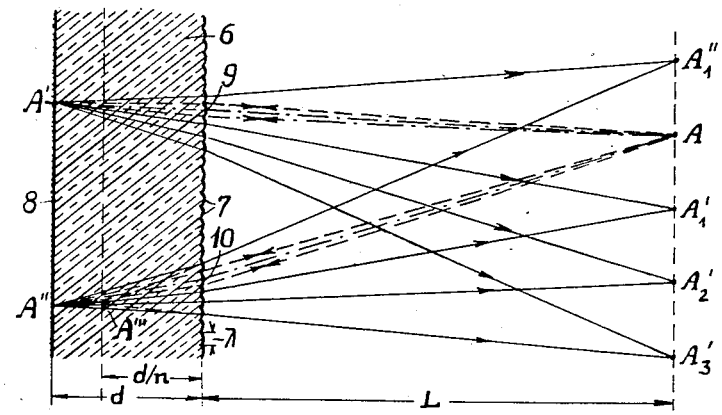
Figure 6:
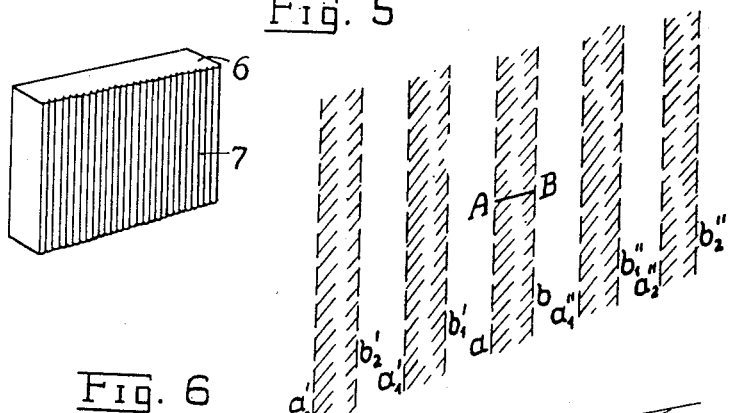

Fig. 5 shows the simplest example of the screen according to the invention, and which is also a constituent of the other, more elaborate examples. In this figure 6 is a transparent plate, to be called "base plate." On its side nearer to the projector it is embossed with equidistant cylindrical lenticulations 7. The curvature of the gofferings is chosen so, that the focal surface of said lenticules—at least for rays incident under nearly right angles to the surface—coincides with the rear surface 8. This surface is covered with a diffusely reflecting layer. The same effect may be produced e. g. by frosting the surface and covering it with a reflecting metallic layer. The view shown is a plan view, the lenticulations have to be imagined vertical.

A is a point of the projector aperture. It may emit a narrow bundle of light, which strikes the lenticule 9. This lenticule will focus the rays on the surface 8 in a vertical line which in this view appears as a point A'. Here the rays are diffused, in all directions or within a certain angle, according to the roughness of the surface 8. Some of the rays will return through the same cylindrical lenticule 9, and they will be focussed in a vertical line $a$ passing through A. This line can be seen in Fig. 6, which is a perspective view of the same arrangement. In Fig. 5 the image of $a$ coincides with A. Other rays diffused at A' will however return through other lenticules. These again—as shown in Fig. 6—will form images $a_1'$, $a_2'$ ... on one side of $a$ and images $a_1''$, $a_2''$ ... on the other side, which in Fig. 5 appear as $A_1'$, $A_2'$ ... and $A_1''$, $A_2''$, etc. Within the limits in which the curvature of the image field of the lenticules can be neglected, these secondary images will be equidistant and situated in a vertical plane parallel to the screen passing through the original point A. But the same is true for all rays emitted by A. To demonstrate this, a second group of rays are shown, which originate from a narrow beam striking a lenticule 10. It can be seen that the linear array of images of A will be the same for any point of the screen, i. e. any ray leaving A. Even in the range of wider angles where because of incomplete aplanatism of the lenticules the images will noticeably depart from said vertical plane, the central rays through the lenticules will still cross exactly in said plane, and the beams coming from different lenticules will still cross here in an "area of minimum confusion." Lack of aplanatism will therefore influence only the sharpness of the images A' etc., not their position. The same is true for another point B of the aperture. It is also obvious that neither the vertical width of the aperture, nor its vertical position have any influence on said images. Moreover it may be noted, that the screen can be moved in an arbitrary way within its own plane without changing said image array, so long as the lenticules remain vertical.

The simple screen according to the invention as described fulfils therefore the functions required, i. e. multiplication and spreading of the aperture images, and therefore—as explained above—it is suitable for showing true spatial images according to the invention. It is however of limited practical use, due to two limitations which follow from the above explanation: Only one audience plane can be served, and this audience plane must be parallel to the screen and pass through the projector. Therefore this screen in itself is not suitable for the usual cinema theatres, but it forms as "base plate" an essential constituent of the schemes to be described later.

The rules for the correct dimensioning of the simple screen or base plate follow from Fig. 5. Let $d$ be the thickness of the plate, $n$ its refractive index and $\lambda$ the spacing of the lenticules. The rays emerging from the centres of the lenticules can be constructed by projecting the images A', A'' on a plane at the distance $d/n$ from the front face, and from these points—of which one, A''' is shown in the drawing—draw straight lines through the centres of the lenticules. If $\Delta$ is the spacing of the seats in the audience and L their distance from the screen—L being also the distance of the projector—we obtain from this construction as a first condition for the dimensioning of the base plate:

$$n.\lambda/d = \Delta/L \qquad 1$$

The second condition is, that the projector shall be sharply imaged on the rear face, or, as the distance of the projector is very large against the thickness of the base plate, the focal length of the lenticules in the medium with refractive index $n$ must be equal to the plate thickness $d$. By these two conditions the relative dimensions of the base plate are completely determined. The absolute dimensions are determined only by the condition that the lenticules must be too small to be individually visible. Below this limit the dimensions are determined only by the convenience of manufacture.

Figure 7:
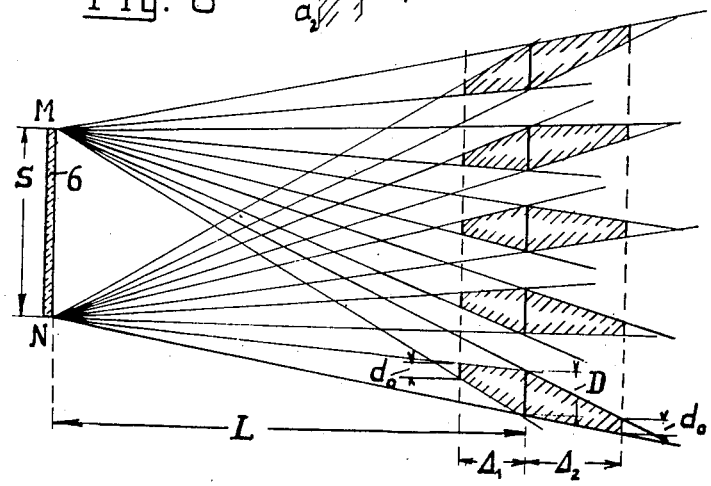

Fig. 7 is a diagram illustrating in a plan view the limits within which the plane of the audience may depart from the plane of the image array, i. e. the plane of the projector. S is the horizontal width of the screen 6. The rays emitted from the two vertical border lines, shown in this view as points M and N, limit the zones within which binocular vision of the whole screen is possible. These zones form part of the lozenge-shaped shaded areas which have their largest width D in the plane which is the optimum position for the audience, i. e. in the plane of the projector. In longitudinal direction these zones are limited by the condition that they must not become narrower than $d_0$, the average eye spacing. In the figure these maximum allowable departures, $\Delta_1$ and $\Delta_2$ appear somewhat different, but in reality as the seats are very much narrower than the screen they become both with good approximation $$\Delta = (D - d_0) L/S \qquad 2$$

In cinema threatres the screen appears from good seats horizontally under an angle of about 0.2 radian. We can put therefore $L/S = 5$. With $D = 20$ cms., and $d_0 = 6.5$ cms. we obtain $\Delta = 67.5$ cms. We can depart by this amount from the optimum position of the seats in longitudinal direction in either sense, without losing binocular vision of the edges of the picture. This result remains true also for the screens to be described later, in which the base plate is used only as a constituent. This result shows, that with the large screens used in modern cinemas fairly accurate registering of audience and aperture images is necessary.

Fig. 8 is a diagrammatic sectional elevation and Fig. 9 is a plan section of a small part of a projection screen according to the invention, which may be used for audience planes forming any angle with the screen surface, provided that the projector is itself contained in the plane of the audience. The screen comprises a base plate 6ª, with lenticulations 7 on its face nearer to the projector. Its rear face is embossed with specially shaped reticulations 11, which have the purpose of dispersing the light only within a certain solid angle. These will be explained in more detail in connection with Figs. 10 and 11. On its front face the base plate is in optical contact with a plate or sheet 12, which contains a regular array of strip-shaped mirrors 13, forming a suitable angle with the screen surface. The purpose of this mirror array is to convert the vertical plane of aperture images formed by the base plate into the actual plane of the audience.

A—B is again the aperture of the projector, contained in the audience plane 14, which appears in the elevation as a line CD—AB. A ray emitted by the projector may strike the screen at a point S. The ray is reflected on a mirror 13, and thrown under a very acute angle at the interface 6ª—12. Here it is reflected somewhat nearer to the perpendicular, as the base plate 6ª is assumed to have a somewhat higher refractive index than 12. At the rear face the ray is dispersed laterally—as shown in Fig. 9—under a fairly wide angle to the right and left of the original ray. In vertical direction—as shown in the elevation—the dispersion is small and unilateral, viz. in that sense that all returning rays include an angle with the horizontal smaller than, or at most equal to the angle of the incident ray. The reason for this is that as the projector is at the remote end of the audience, it would be waste of light to illuminate the audience plane beyond the projector.

In the elevation, Fig. 8, the trace of two fans of rays is shown. One of these returns on exactly the same way as it came. As however the rays in this fan spread laterally—horizontally—they will not all return into the projector itself, but only pass through the horizontal line through A—B. I will show that they form in this line a number of equidistant images of the projector slit A—B. This will be best understood by following step by step the images formed by the system. The rays entering 12 and refracted at the plane front face will appear coming from an image A″—B″ of the projector slit which is outside the drawing, at a distance $n$ times the distance of A—B from the screen, if $n$ is the refractive index of 12. After reflection on a mirror 13 these rays will appear as coming from the mirror image of A′—B′. Of this image A′—B′ the lenticules of the base plate will produce a series of equidistant image-bands in the vertical plane passing through it. One of these image-bands appears in the elevation as A′B′—C′D′, in the plan view as C′A′—D′B′. The plan view, Fig. 9, shows the construction of these images in the same way as explained in connection with Fig. 5. The plane containing the whole array of images is now again mirrored on one or several of the mirrors 13. It matters very little whether the bundle of returned rays is reflected on one or several of the mirrors, as they are very closely spaced and their distances are negligible against the dimensions of the theatre. In the drawing the dimensions had to be made of the same order, otherwise it would have been impossible to show details. Therefore the drawing has been made so that it appears as if only one mirror, the extension of which is shown as a dotted line, produced the mirror image C″D″—A″B″ of C′D′—A′B′. This image is also in the medium $n$ and has to be "reduced" finally to air, by reducing all perpendicular distances from the screen in the ratio $n$. This "reduction" represents in good approximation the refraction of the rays when they pass through the plane front face of the screen into air. This gives a plane AB—CD as shown, which passes through the line of the projector slit, and has a certain inclination against the horizontal, which depends on the inclination of the mirrors in the array, and on $n$. In the operations of mirroring and reducing the image to the refractive index of air all lengths parallel to the line A—B remain unchanged, as this line is both parallel to the mirrors and to the surface of the screen. Therefore the lateral spacings of the aperture images in the plane A—C will be as shown in Fig. 9. The screen as shown is therefore a complete solution for cinemas with only one audience plane, if the projector itself can be accommodated in this plane.

In the above explanations it has been assumed that reduction from air to a medium $n$ and vice versa consists in a proportional reduction of the distances from the plane boundary between the two media. This is rigorously true only for rays nearly at right angles to the surface. A more rigorous calculation shows that the aperture images will be contained in a surface which may be called the "image field" with a slight curvature, which is however so small that it can be safely neglected under most practical conditions.

The above explanations related to the forming of the image field by a small part of the screen, and in these explanations the small mirror-strips forming the array could be treated as a single mirror. The differences between a mirror-array and one large mirror become evident when the cooperation of different parts of the screen is considered, which will be done at the end of this specification. It may be noted that the effects obtained by a mirror-array in a screen according to Figs. 8 and 9 can be also obtained by a single large mirror, but closer investigation shows that this would have to be of excessive dimensions. Other advantages of mirror arrays over single large mirrors will be demonstrated later.

Figs. 10 and 11 give examples for the shaping of the rear face of the base plate, which will produce unilateral dispersion, and only within a certain angular range. The rear face is embossed with ledges of approximately prismatic shape, one side 15 of which ledges may be straight, whilst the other, 16 in Fig. 10 and 17 in Fig. 11, has to be curved, but can be concave or convex. Unilateral distribution is obtained in both cases by arranging the centre of curvature on one or the other limiting ray of the beam incident from the projector. Limiting rays are those which just pass an edge. In both arrangements as shown the dispersion is in the sense that rays will be returned only under angles to the horizontal smaller than that of the incident light. If the projector were arranged at the near end of the audience, this would have to be reversed, and if the projector is arranged somewhere in the middle of the audience, bilateral distributions with limited dispersion angles can be obtained in a similar way. In order to obtain also horizontal dispersion—at right angles to the plane of Figs. 10 and 11—the surfaces of 16 and 17 may be ruled with very fine and closely spaced lines or grooves 16' and 17' parallel to the plane of the drawing. The two functions of vertical and horizontal dispersion can be also separated, the latter can be effected by a special interface, very close to the rear surface, closely ruled with vertical lines.

As the rays have to be reflected almost at right angles to the surfaces 16 and 17, it is necessary to make them reflecting, e. g. by silvering. It is however advisable to leave the surfaces 14 free of reflecting coating, in order to let pass the light which has missed the mirrors 13, and which otherwise might produce unwanted spurious images.

Fig. 12 shows in more detail the construction of mirror arrays according to the invention, which is considered as novel in itself. The array is made up of two sheets of transparent, preferably plastic material, 18 and 19, moulded with a saw-tooth profile. The sides 20 of the saw-tooth profile have a small inclination $\epsilon$ against the horizontal, determined only by the convenience of moulding, whereas the angle $\delta$ of the other flank is prescribed by the optical requirements. The two sheets have complementary shape, so that after being joined together as shown, they leave a number of plane parallel gaps 21 between them. These are totally reflecting mirrors for rays incident under a sufficiently large angle, whereas rays nearer to the perpendicular will pass through them without change in direction and with little if any loss of intensity. It is sufficient to make the gap with a width equal to about one wavelength of visible light, or about $6.10^{-4}$ mms. to obtain practically 100% reflection under angles exceeding the critical angle. Materials suitable for mirror arrays according to the invention are for instance ethyl cellulose, ($n=1.47$), vinyl acetate, ($n=1.47$), and Catalin ($n=1.46$). These substances are particularly suitable because of their low refractive indices, as for reasons to be explained later it is preferable to use array-sheets of lower refractivity than the base plate. These transparent plastics can be moulded with a highly polished surface, which does not require any further machining or polishing. They can be joined by means of a suitable transparent adhesive— e. g. a solution of the plastic substance itself—or, in the case of some plastics even without any adhesive, if only care is taken that pressure is exerted on the surfaces 20 at which optical contact is to be established, and a suitable temperature is maintained for some time.

These mirror arrays may be made conveniently with thicknesses of the order of 1 mm. Convenient thicknesses of the base plate are of the order 10–30 mms. In the drawings the thicknesses of the array-sheets and of the base plate had to be shown as of the same order of magnitude, or else it would have been impossible to show details of the former.

Fig. 13 is a diagrammatic section of a projection screen according to the invention suitable for theatres with one audience plane with arbitrary inclination and arbitrary position of the projector. 6 is again the base plate, its rear face is fitted with reticulations 22, which will be explained in more detail in connection with Fig. 18. The base plate is in optical contact with a saw-toothed sheet 23, to which is joined in turn a second saw-toothed sheet 24. These two sheets form between them two arrays of totally reflecting surfaces consisting of plane parallel gaps 25 and 26, forming suitable angles, to be determined later, with the horizontal. "$i$" is a ray coming from the projector. It is reflected on one of the gaps 25, and thrown under a very acute angle against the interface 6—23. The ray is diffused at the rear face horizontally—i. e. at right angles to the drawing—under a fairly wide angle and to both sides, but in vertical direction unilaterally and under a small angle, as shown in the figure. To avoid confusion, only a single ray is shown, and this is shown as if it were dispersed at one point of the rear face. It is clear from the foregoing explanations, that to be quite exact a narrow, almost parallel bundle of rays would have to be substituted for the single ray, different rays of said bundle falling on different parts of the reticulations 22 and being reflected under different angles. The dispersed beam is reflected on one or several of the gaps 26 and sent back so as to cover the whole audience plane 14 with zones of vision. The function of this screen can be explained in a similar way as in the case of the model shown in Figs. 8 and 9. If the gaps 25 and 26 are properly adjusted, the rays striking the gaps 26 will appear as if coming from a projector in the plane of the audience, at the same distance from the screen as in reality. The rest is the same as in the case of the previous model.

Fig. 14 shows the mirror arrays of Fig. 13 in more detail. If metallic, e. g. silvered mirrors were used, they would interfere with one another. According to the invention however total reflection is used, and as Fig. 14 shows, the gaps can be arranged in such a way that each reflects only the rays which are meant to be reflected on it. This is shown in the case of the incident ray "$i$," which is meant to be reflected only on the gaps 25. It can be seen that on the gaps 25 "$i$" falls outside the cone with the half opening angle $\Theta$, the critical angle of the total reflection, and it is therefore reflected, whereas after reflection it will pass the gaps 26. Similarly it can be shown that "$i'$" will pass 26 if it falls on it directly instead of hitting a gap 25 first, and finally, it can be shown that the returning rays are reflected only by 26 and not by 25, provided that the angles of the gap faces 25 and 26, and the critical angle $\Theta$, which depends on the refractive index of the substance of 23 and 24 are properly chosen. This will be shown in more detail in connection with a later example. The mirror arrays to the screen in Fig. 13 can be made up also of two separate arrays according to Fig. 12.

In the screens shown in Figs. 8, 9 and 13 the light passes through the lenticules under very large angles to the perpendicular. If simple goferings were used, as shown in the diagrammatic Fig. 9, the curvature of the focal surface of the lenticules would prevent the formation of sharp images. It is therefore necessary to use cylindrical lenses which have focal fields with small curvature in sections of said field parallel to the lenticule axes. For practical cinema theatres this range might be as large as 60–87°. It is very difficult to construct lenses aplanatic in such a wide range, especially nearer the upper angular limit. This difficulty is largely reduced if according to the invention separate lenticules are used immersed in a medium with higher refractive index than the material of the arrays. Fig. 15 shows an example of lenticules embedded between two sheets of preferably equal refractive index, which is also preferably equal to the refractivity $n_b$ of the base plate 6, which is higher than the refractive index of the array sheets, which may be termed $n_o$. Even small differences of the refractivities produce a considerable simplification of the problem. If e. g. $n_o=1.46$ and $n_b=1.50$, an angular range of 60–87° will be transformed into a range 57.2–76.4°, which is already much easier to handle. There is no difficulty to produce even much larger reductions, as the range of the refractive indices of transparent plastics extends to 1.75, (polystyrenes), and even to 1.90, (urea-formaldehydes). With the last value the said angular range could be reduced even to 39–50°. A high refractive index of the base plate has also another advantage. As can be seen in Fig. 13, the ray will leave the screen at a point considerably below the point through which it entered, which may be several times the screen thickness. This in itself has no influence on definition and on image distortion, but it has the consequence that the lenticules must be exactly vertical. If therefore the screen is made up—as will be the case in general—of smaller parts, these have to be adjusted laterally with considerable accuracy. This can be noticeably reduced by a high refractive index of the base plate. It may be noted that this difficulty does not at all arise in the scheme as shown in Figs. 8 and 9, as here the rays will leave the screen always on almost the same path as they have entered it. But that scheme is applicable only if the projector is arranged in one plane with the audience.

Fig. 15 shows an example of a lenticule, which has been calculated so as to give an almost perfectly flat field in the angular range 60–75° in the medium of the base plate with the refractive index $n_b$. The data of this lens are as follows: The refractive indices are in the relation $$n_b : n_1 : n_2 = 1 : 1.02 : 0.98$$

For example: $n_b=1.50$, $n_1=1.53$, $n_2=1.47$. The refractive index of the array-sheets may be in this case preferably $n_o=1.46$. The linear dimensions are in the relation $$r_1 : r_m : r_2 : d_1 : d_2 : \lambda : d = 1 : 13.3 : 1.075 : 0.26 : 0.16 : 1.2 : 70$$

The symbols have the meaning as explained in Fig. 15. $\lambda$ is the width of the lens, and at the same time as the lenses are arranged without gaps between them, it means also the spacing of two lenses, as in Fig. 5. Gapless arrangement is preferable in order to utilize as much as possible of the light. For the same reason lenses are preferable in which all interfaces meet as nearly as possible in one edge, so that no confusion arises at the edges by light crossing over from one lens into the other. The present lens fulfills this condition very nearly. As however the edges can not easily be made as perfect as the rest of the lens, it may be advisable to cover them to a certain small width e. g. with dark paint. "$d$" is, as before, the thickness of the base plate, and at the same time the horizontal projection of the focal length $f$, as the focal surface must coincide as nearly as possible with the rear face of the base. How nearly this is achieved in the present lens is shown in Fig. 16, which shows a section of the focal surface in the vertical median plane of the cylindrical lenticule. The curvature of this focal surface at right angles to the plane of the drawing turns out so small as to be practically negligible.

The above calculation gives only relative dimensions and relative refractive indices. How large e. g. $\lambda$ is chosen depends on the achievable accuracy of manufacture. If e. g. the lens can be made sufficiently accurate with $\lambda=0.5$ mm., the thickness of the base plate becomes $d=29$ mms. If it is possible to make $\lambda=0.2$ mm., $d$ will be only 11.6 mms.

The necessary accuracy in making these lenticules is not very high. Errors of $\pm5$ to $\pm10\%$ in the focal length are admissible. This can be seen as follows: If the horizontal projection of the focal length $f$ is e. g. by 5% longer or shorter than the thickness $d$ of the base plate, the lenticules will concentrate a parallel beam not in a sharp line, but in a narrow zone of the width $0.05\lambda$. On return this will not produce a parallel beam, but a beam with the slight divergence angle $0.05\lambda/d$. This does not matter so long as it is smaller than the angular limit of eye resolution. According to Eq. 1 this divergence angle is $0.05\lambda/L$. (We can put $n=1$ in Eq. 1 as there is only a small difference between the refractive indices $n_b$ and $n_o$.) As an example let us consider an arrangement of the seats as in Fig. 3. This gives about $\Lambda=50$ cms., and assuming $L=25$ ms. we obtain a divergence angle $$0.05 \times 50/2500 = 1/1000 = 3.6'$$

This is about the limit of the eye resolution in moving pictures. We can therefore allow an error of $\pm5\%$ in the case of a theatre as shown in Fig. 3 and in the case of staggered rows, as in Fig. 4, even twice as much or $\pm10\%$ as in the latter case $\Lambda$ is only about 25 cms. If the aperture of the lenticules is restricted, e. g. by covering the edges with black paint, the necessary accuracy can be lower still, but at the same time the efficiency is also lowered.

The rather elaborate lens shown in Fig. 15 can be radically simplified if the refractive index of the base plate and of the multiplier is considerably higher than the index of the array sheets, as in this case, as we have shown above, the angular range in which a flat field is required will be much restricted, and the whole range shifted much nearer to the perpendicular. The above example may be considered as a rather extreme case, if it is desired to build up the screen out of transparent materials with refractive indices differing as little as possible. Small differences in the refractive indices have the advantage that reflections at the interfaces, which could give rise to halo or spurious images are suppressed.

Another method may be however used according to the invention to suppress interfacial reflections, which is considered as novel in itself. Between the two components of different refractive indices a thin layer of transition is produced, in which the refractive index varies in small steps or continuously from the value corresponding to one component to the value corresponding to the other. It is known, that appreciable reflection will only occur where the refractive index changes abruptly or in a continuous fashion, but by an appreciable amount within a fraction of a wavelength. But if the transition layer has a thickness of at least a few wavelengths, the reflection is reduced to a negligible fraction.

The transition layer according to the invention may be realized by different methods. The most advantageous case is if the two transparent plastic substances in question have unlimited solubility in one another. In this case it is sufficient to unite the surfaces with a certain small amount of a mutual solvent between them, and keep them for some time at a suitable temperature, until the solvent has dissolved a thin surface layer of each, and these have gradually diffused into one another. Finally the small quantity of solvent is absorbed in the bulk of the plastics, or evaporated through the surface. In the more general case when the two plastics have a common solvent but no tendency to form homogeneous solutions in one another, it is still possible to form a transition layer which appears continuous for light, provided that the two constituents are thoroughly mixed within regions smaller than a wavelength of light. This can be done by precipitating mixtures of the two substances by rapid evaporation of the solvent from a solution containing both substances in suitable proportions. This may be done e. g. by spraying both substances from a sprayer containing pure solutions of each in separate containers. Care must be taken that either the two solutions are mixed very thoroughly before breaking up the jet in droplets, or to break it up in droplets so small that each droplet contains of the dissolved plastic only a quantity which when dry assumes dimensions below one wavelength of light. The two containers may be fitted with two taps or valves, so that during the spraying the composition of the spray changes gradually from one substance into another. The transition layer may be treated finally by the usual processes of pressing and heating.

Reflection even at small differences of the refractive indices will be particularly strong where the ray includes a very small angle with the surface, i. e. particularly at the interface between the base plate and the array-sheet 23. If the refractive index of the base plate considerably exceeds that of the array-sheets it may not be necessary to apply transition layers also to the other interfaces, as at these the ray passes much nearer to the perpendicular, and the difference between the refractive indices of the lens constituents is small. If however $n_b$ exceeds $n_o$ only by a small amount, it might be necessary to give also other lens surfaces a special treatment.

Fig. 17 is a perspectivic view of a small section of a screen according to the diagrammatic drawing in Fig. 13. Parts of the layers of which it is successively built up have been stripped off to show its inner structure. The thickness of the base plate 6$^b$ has to be imagined as about ten times the thickness of the sheets covering its front face.

The lenticules 27 are embedded between two sheets 28 and 29, preferably of the same material as the base plate. 28 and 29 with the immersed lenticules 27 between them may be called together the "multiplier sheet" as it is this member which performs essentially the multiplication of images. The two saw-toothed sheets 23 and 24 form together the "array-sheet," which is joined to the multiplier sheet with the interposition of a suitable transition layer of only a few wavelengths thickness to prevent interfacial reflections. To the front face of the array sheets is joined in turn—again with a suitable transparent adhesive—a saw-toothed sheet 30 with prismatic ledges 31. This serves the purpose of avoiding glare at the front face of the screen, i. e. to prevent rays arriving from the projector to be reflected into the eyes of the audience. This member can be dispensed with if either the projector is given a suitable position, or if the screen is suitably curved around a horizontal axis.

Fig. 18 is a perspectivic rear view of a small section of the base plate, to show the gofferings 22. These are double gofferings, very finely ruled in vertical direction—of the order of e. g. 20 lines/mm.—and much less closely ruled at right angles to it, with spacings of the order of a few mms. The vertical gofferings must be very fine and very close in order not to interfere with the sharpness of the aperture images thrown on the rear face by the lenticules, and they must have considerable curvature in order to produce the necessary divergence of the returned rays in the horizontal direction. On the other hand the curvatures in the vertical plane—as shown in Fig. 13—must be small and so dimensioned that the rays are dispersed unilaterally and only in a narrow angular range. Each element 22 forms a small, oblong shaped toroidal mirror.

As compared with the patterns in Figs. 10 and 11, this one has the advantage that it need not be metallized. The rays arrive at it under such grazing angles that total reflection is amply sufficient. This has also the great advantage that rays which have missed the right mirrors and therefore arrive at the rear face much nearer to the horizontal will pass through it and not blur the picture. It is advantageous to back the rear face with a dark material which absorbs the spurious rays.

Figure 19:
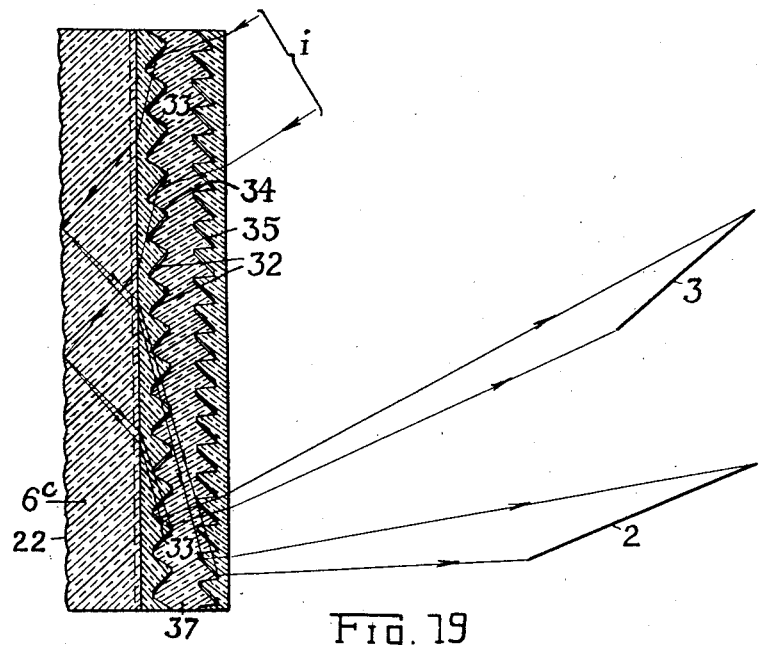
Figures 20, 21:
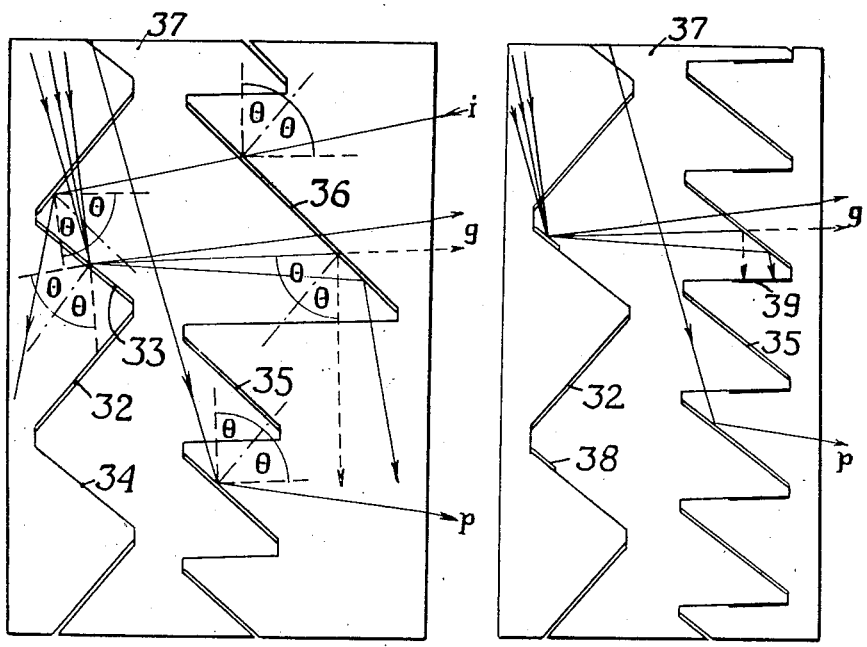
Figure 22:
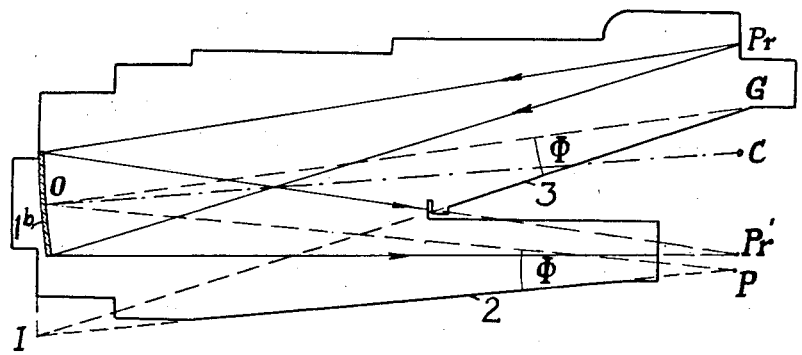

Fig. 19 is a diagrammatic section of a projection screen according to the invention, suitable for cinema theatres with two audience planes—pit and gallery—with arbitrary position of the projector. This screen is essentially the same as shown in Fig. 13, but a further mirror array has been added to serve the second audience plane. But here a new problem arises out of the circumstance, that the galleries of cinema theatres do not extend as near to the screen as the pit. A section of a cinema theatre is shown in Fig. 22. From this figure it becomes clear that if the image field were merely doubled by the addition of a new mirror array, confusion would result from the fact that rays destined for the gallery but striking its plane nearer than its balustrade would strike the pit instead. Longitudinal limitation of the field of aperture images is therefore necessary in the case of the gallery, and this means the necessity of angular limitation of the rays serving the gallery. Figs. 19, 20 and 21 show how this difficulty is overcome according to the invention.

The base plate 6$^c$ is the same as in Fig. 17. Three mirror arrays are arranged before it, of which two are constructionally united, by forming facets of the same saw-toothed profile. The mirrors 32 are used for reflecting the rays "$i$" incident from the projector, whereas the mirrors 33 are serving the gallery 34. But whereas every facet 32 is a mirror—i. e. a totally reflecting surface—only a fraction of the other facets—in Fig. 19 one in ten—are used as mirrors 33. The other facets 34 are in optical contact with the facets of the opposite sheet. This is the first measure according to the invention, by which the light is distributed in the right proportion between pit and gallery, and by which the limitation of the beam for the gallery is effected. Rays which will eventually strike the remote part of the audience planes leave the base plate under steeper angles to the horizontal than rays destined for seats nearer to the screen. It will be seen from Fig. 19 that the gaps 33 present a sufficient intercepting surface for very steep rays, whereas less inclined rays will pass between them in increasing proportion. Closer investigation shows that it is possible by suitable dimensioning to make the intensity of the light approximately equal for pit and gallery, but to make the intensity of the light which would pass the balustrade at the near side fall off rather steeply. In order to be perfectly effective, this measure has to be backed by another, which will be explained in connection with Figs. 20 and 21.

In front of the arrays 32 and 33 a further array of totally reflecting surfaces 35 is arranged, which serves the pit 2. The imaging functions of these arrays are the same as in Fig. 13. It requires however special investigation whether it is still possible to avoid interference of these arrays with one another. It is shown in Fig. 20 that this is indeed possible.

In order to formulate the conditions which have to be satisfied by the mirror arrays we will call "$i$" rays the rays incident from the projector, "$p$" rays the rays destined for the pit, and "$g$" rays those destined for the gallery. For short we will call the gaps 32 on which the "$i$" rays are first reflected "$i$-mirrors," and correspondingly the gaps 35 and 33, on which the "$p$"- and the "$g$"-rays are ultimately reflected before leaving the screen "$p$-mirrors" and "$g$-mirrors" respectively. By following the rays from their incidence step by step through the successive reflections in the screen to their exit, we arrive at the following scheme:

| Rays | Mirrors | | |
|---|---|---|---|
| | i | p | g |
| Rays "$i$" incident from projector | Refl. | Pass. | Pass. |
| After reflection on "$i$-mirrors" | | | Pass. |
| After dispersion at the rear face | Pass. | Refl. | Refl. |
| After reflection on "$g$-mirrors" | | Split | |

These are eight conditions, illustrated in Fig. 20. Five of them, including the condition "split" are shown explicitly as fulfilled by comparison with the critical angle $\theta$ of total reflection. The other conditions are also fulfilled, and they can be easily checked although the critical directions could not be inserted at every crossing point of rays and gaps to avoid confusion in the drawing.

It can be seen in this drawing, that the condition of angular limitation of the rays destined for the gallery, corresponding to the condition "split" in the above scheme has been achieved by arranging in front of the "$g$-mirror" 33 a "$p$-mirror" 36 larger than the other "$p$-mirrors" 35. This is necessary, or else the deflected rays might fall on another "$p$-mirror" and be thrown again into the audience. Registering of 36 with 33 is ensured by using only one central sheet 37, moulded with saw-tooth profiles on both sides. It can be seen that whereas $g$-rays above a certain inclination can pass, other rays $g'$ with smaller or negative inclination against the horizontal are cut off by total reflection. In reality the cut-off sets in to a certain extent already for rays nearer to the perpendicular than the critical angle $\theta$, where reflection increases gradually until it becomes 100% at the limit of total reflection. But by the above mentioned measure of suitably spacing the $p$-mirrors, the intensity of $g$-rays in the unwanted range is already largely reduced. By combining the two measures the cut-off becomes so sharp, that within a few degrees from the balustrade the unwanted light may be reduced to less than 1%. It can be also shown that if the other conditions "reflected" or "pass" are not fulfilled to a 100%, but only partially—as reflection does not set in with a discontinuous jump at the limit of total reflection, but gradually in a certain narrow angular range—this will result only in a certain small loss of efficiency, and not in a blurring of the picture.

An alternative design is shown in Fig. 21. Here the "$i$-mirrors" 32 are the same as before, but instead of making e. g. every tenth facet a "$g$-mirror," as in the previous figures, only a fraction of the facets is fitted with a gap 38 which now serves as a "$g$-mirror." The advantage is that the arrays need not be made on a very small scale to make their periodic structure invisible to the eye. The "$p$-mirrors" 35 are the same as in the previous figure, but instead of making a part of them project in front of the others, a part 39 of the other facets of this array is covered with an absorbing paint or other dark substance to absorb the "$g$"-rays which have been deflected out of the original bundle. All angles are the same as in Fig. 20 and consequently all conditions regarding reflection or passage of the rays are fulfilled in the same way.

In the projection screen shown in Fig. 19 both the image-field covering the gallery, and the image-field covering the pit are produced out of a vertical image-field, produced by the multiplier plate, by means of mirroring said vertical field on the $g$- and $p$-mirror arrays. But in mirroring transformations on plane mirrors the angle between an image and the rays forming said image remains unchanged. Therefore a relation exists between the two image-fields and the corresponding rays, which can be expressed as follows: At points of the pit and gallery, which are at equal distance from the screen, the rays coming from the same point of the screen will include the same angle with the planes of the audience. This is illustrated in Fig. 22 which shows a sectional elevation of a cinema theatre suitable for screens as described. 1 is the screen, 3 the gallery, 2 the pit, Pr the projector. The above relation is illustrated for the two points G and P of gallery and pit, which are at the same distance from the screen as the projector Pr in the example of rays coming from the central point O of the screen. The rays include the same angle $\Phi$ with both audience planes. If this relation is fulfilled for one pair of corresponding points—i. e. for points at equal distance from the screen or approximately: for points in the same vertical line—it will be very nearly fulfilled also for any pair of corresponding points. The condition is—with good approximation—identical with the following: The planes of the gallery and of the pit must intersect in a horizontal line vertically below the screen. This condition is fulfilled in Fig. 22, the line of intersection appears as a point I.

The said condition is actually very nearly fulfilled in most cinema theatres. Fig. 22 is a sectional elevation of an existing cinema theatre, in which in order to fulfill the condition merely the inclination of the pit had to be increased by about 3°. In almost all practical cases the fulfilment of the condition requires only very small changes. Apart from the said small banking of one or both of the audience planes, only the seats have to be rearranged in parallel rows at the correct lateral distance. The position of the projector can remain unchanged, but it has to register with one or the other column of seats. Several projectors may be also used, if only care is taken that their distance is an exact multiple of the lateral spacing of two seats.

By substituting the screen according to the invention instead of the ordinary diffusing screen a new problem arises by the reflections at the front face of the screen. The glare must be made invisible. This problem does not arise in the case of simpler cinemas with only one audience plane in which the projector is at one end of the audience plane, as in Fig. 8, if—as usual—the audience plane is almost horizontal and the screen well above it. In this case a plane screen may be used, and the mirror image of the projector will not be visible from any part of the audience. In larger cinemas however—especially if it is not desirable to change the position of the projector—it is necessary to suppress the mirror image of the projector by special measures. One of these is shown in Fig. 22. The screen $I_b$ is cylindrically curved around a horizontal axis passing through the point C, which is at the same distance as the projector. It is seen that the screen surface will produce a mirror image of the projector Pr at Pr', which is in such a position that it is invisible from any point in the audience. Another method for avoiding the glare consists in providing prismatic ledges at the front face, as in Fig. 17. Both methods can be also used in combination.

It may be noted, that a curved screen according to the invention does not necessarily mean curved images. Provided that the screen fulfills the optical conditions illustrated in Fig. 1, a flat picture can be projected on any vertical plane—not necessarily the projector plane—and this will be seen flat from the projector, or any seat at the same distance, and with only an unnoticeable curvature from other seats. But it is necessary to prove that a curved screen can fulfill the above mentioned optical conditions.

Having now described the principles of the invention and some of the patterns in which it may be embodied, I describe now the methods by which projection screens according to the invention may be quantitatively designed and calculated, so as to be suitable for cinema theatres of predetermined design. In order to make the following theory as comprehensive as possible I assume the most general case, i. e. a cinema theatre which has pit and gallery, and in which the projector is contained in neither of the two audience planes, and which fulfils only the condition illustrated in Fig. 22. I assume also the most general screen, consisting of a base plate with three mirror arrays, and which in addition is both curved and fitted with prismatic ledges. All necessary data of the cinema theatre which enter into the calculation of the screen are explained in Fig. 23, and all essential data of the screen in Fig. 24.

The projection screen is specified by the position of its centre O, by its curvature radius R, and by the inclination against the horizontal $\mu_0$ of the perpendicular to the screen in O. Any other point of the screen may be specified by its height Z above O. The cinema theatre is specified by the following data: The distance L of the projector from O—for which the horizontal distance may be substituted without committing an appreciable error—and the angle $\Psi_i$, which the ray Pr—O includes with the horizontal. The gallery is specified by its point G which is at the distance L from the screen. The ray O—G includes an angle $\Psi_g$ with the horizontal, and the plane of the gallery an angle $\Gamma_g$. The pit is similarly specified by the angles $\Psi_p$ and $\Gamma_p$. These are however connected by the relation $$\Gamma_g - \Psi_g = \Gamma_p - \Psi_p = \Phi \qquad 3$$

where $\Phi$ is the angle of the ray from O to G with the gallery, which must be—as shown above—the same as the angle of the ray O—P with the pit.

Rays from a point S of the screen to Pr, G or P include with the perpendicular to the screen surface, i. e. with the radius vector from C, the angles $\theta_i$, $\theta_g$ and $\theta_p$. Only one is shown in the drawing, to avoid confusion. The angles $\theta$ follow from the other data by the relation $$\theta = \Psi - \mu - Z/L \qquad 4$$

where $\theta$ and $\Psi$ can have any of the suffixes $i$, $p$ or $g$. The angle $\mu$ of the screen perpendicular to the horizontal is given by $$\mu = \mu_0 - Z/R \qquad 5$$

Both 4 and 5 are approximate equations, but sufficiently accurate under the condition—always fulfilled in practice—that all angles in question are small.

Figure 23:
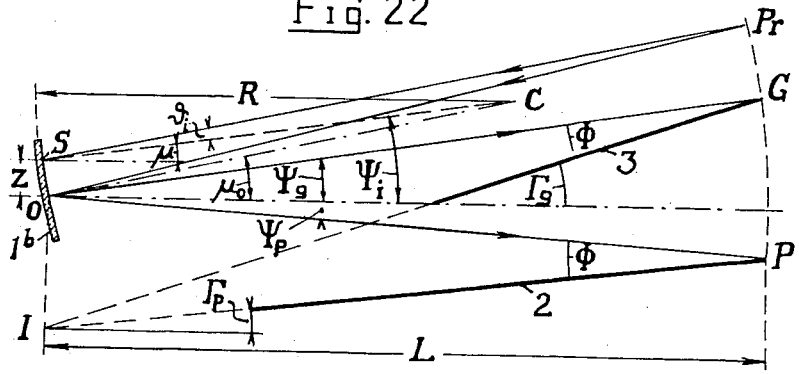
Figure 24:
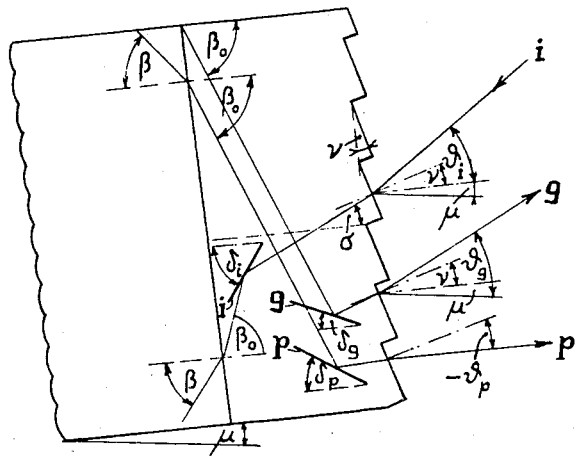

Fig. 24 is a diagrammatic cross section of the projection screen, explaining its data and the symbols used in its calculation. In this figure $\mu$ is again the inclination of the screen. $\nu$ is the angle of the active facets of the prismatic ledges with the screen surface. The other facets may be covered with a dark paint. The inclinations of the mirrors "$i$," (for the incident rays), "$g$," (for the gallery), and "$p$," (for the pit), are in turn $\delta_i$, $\delta_g$ and $\delta_p$. These angles are measured not against the horizontal, but against the perpendicular to the screen surface. (Disregarding the prismatic ledges.) Three rays are shown, $i$, $p$ and $g$, which are understood to come from or go to the points Pr, P and G in Fig. 23. After refraction at the front they include angles $\sigma$—with suffixes $i$, $p$ and $g$—with the screen perpendicular. For simplicity we talk of the rays as if they were all going in one direction, otherwise we should have to reverse the use of the words "before" and "after" when talking of the incoming and outgoing rays, although the direction makes no difference in geometrical optics. After reflection at the mirrors $i$, $p$ and $g$ these rays will all form angles of the same absolute value $\beta_0$ with the screen perpendicular, which after refraction by the base plate changes into $\beta$. That these angles must be all equal may be best understood by considering that the multiplier plate produces an array or field of images in a plane parallel to the screen surface, (see Figs. 8 and 9), passing through the mirror image of the projector in the $i$-mirrors. Therefore the rays going to the points G and P, which are at the same distance from the screen as the projector, will have to leave the multiplier at the same absolute angle $\beta_0$ at which they entered it. In the case of Fig. 8 this meant that the rays retraced their original path. In this case it means that those rays will go to G or P which have been reflected at the rear face of the base plate as on a plane mirror.

We can now formulate the conditions which have to be fulfilled by the screen as follows:

a. Rays incident from the projector which have been reflected at the rear face as on a plane mirror must be returned from any point of the screen to the horizontal lines in pit and gallery which are at the same distance from the screen as the projector. (I. e., lines passing through P and G at right angles to the drawing in Fig. 22.)

By this we have fixed one line of the image fields. If we assume these to be plane—which assumption is shown to be very nearly exact by a more detailed calculation—it is sufficient for defining them completely to postulate that:

b. The inclination of the image fields passing through the points P and G against the horizontal must be equal to $\Gamma_p$ and $\Gamma_g$ respectively.

To these must be added a "lateral" condition, postulating that:

c. Every point of the screen must produce the same lateral spacing of the aperture images.

No condition is needed to specify the width of these images, as these will be always the same, and equal to the width of the projector aperture.

We can now formulate the three conditions mathematically. In the following we assume that all angles with the exception of the angle $\beta_0$ are so small that we can replace their sines by the angles themselves, whereas the $\beta_0$'s are so near to a right angle that their cosines can be replaced by $(\pi/2-\beta_0)$. The refraction of the rays at the surface of the prismatic ledges, (Fig. 24), gives $$\sigma - \nu = (\theta - \nu)/n_o \qquad 6$$

with any of the three indices $i$, $p$ or $g$ for $\sigma$ and $\theta$. $n_o$ is the refractive index of the array sheets. Combining the law of reflection with condition $a$ we obtain $$\beta_o = 2\delta_i - \sigma_o = 2\delta_g + \sigma_g = 2\delta_p + \sigma_p \qquad 7$$

and combining these with Eqs. 4 and 6, two equations result, of which we give only the first, as the second results by exchanging the suffix $g$ for $p$:

$$\delta_i - \delta_g = (\Psi_i - \Psi_g - 2\mu + 2(n_o-1)\nu - 2Z/L)/2n_o \qquad 8$$

This is the mathematical formulation of the first condition. To formulate the second we refer to Figs. 8 and 9. From these figures it will be clear that if the mirrors were immersed into a medium with the refractive index of air, the angle between the incident ray and the screen would be the same as between the same ray after reflection and the image field. This follows generally from the fact that mirroring does not change the angles between rays and images. By the refractive index $n_o$ of the arrays—as can be seen in the same figure—the angle in the medium of the arrays is reduced so that we obtain approximately $$\pi/2 - \beta_o \cong (\Phi + Z/L) n_o \qquad 9$$

Combining this with Eqs. 3, 4, 6 and 7, we obtain two equations expressing condition b./, of which we give again only one, as the other differs only in the suffix $p$ for $g$:

$$\pi/2 - 2\delta_g = (\Gamma_g - \mu + (n_o-1)\nu)/n_o \qquad 10$$

These are the equations for $\delta_g$ and $\delta_p$. Combining Eq. 10 with 9 and 3, we obtain the equation for $\delta_i$:

$$\pi/2 - 2\delta_i = (\Phi - \Psi_i + \mu - (n_o-1)\nu + 2Z/L)/n_o \qquad 11$$

These equations completely determine the mirror arrays if the data contained in Fig. 23 are known. We are still free to choose the quantities R, $\mu_o$ and $\nu$, with a view of obtaining a screen as simple as possible and free of front face reflection. It can be seen however that if $\delta_g$ and $\delta_p$ are kept constant throughout the screen—i. e. independent of Z—it is not possible to keep at the same time also $\delta_i$ constant and vice versa. This is a disadvantage of the examples shown in Figs. 13, 19 and 24 as compared with the simple screen in Fig. 8. It is however possible to retain this advantage also in the case of theatres with two audience planes, and use the $p$-array or the $g$-array also for the incident ray, but only if the projector is arranged either in the plane of the pit or in the plane of the gallery.

There remains the condition c of constant lateral spacing of the aperture images. This is similar to Eq. 1. After refraction at the front face the projector appears to be at a distance $n_o.L$, and after reflection at the $i$-mirrors at a distance $n_o.L.\cos \beta_o$. In the medium of the base plate with the refractive index $n_b$ this distance—which is measured at right angles to the screen—appears to be $n_b.L.\cos \beta_o$. From Figs. 8 and 9, using Eq. 9, we obtain for the spacing $\Lambda$ the following value:

$$\Lambda = \frac{\lambda}{d} n_b L \cos \beta_o \cong L \frac{\lambda}{d} \frac{n_b}{n_o} (\Phi + Z/L) = \text{const.} \qquad 12$$

As the factor in brackets—which represents the angle under which an observer at the end of the audience will see the different parts of the screen above the heads of the persons before him—is not constant, it is necessary to vary one or several of the other factors so as to keep the spacing $\Lambda$ constant. It is best to keep $\lambda$ constant and to vary only $d$, the thickness of the base plate, in such a way that it is smallest at the bottom of the screen and increases—preferably continuously—towards the top. Eq. 12 means that the base plate must be wedge shaped, with the edge in the line "I" in Fig. 22. As the focal length of the lenticules must be equal to $d$, these must be varied too. But these need not be varied continuously, as a departure of about $\pm 10\%$ is admissible from the correct value. Therefore a set of about 6 different sheets of lenticules will be sufficient even for theatres like the one shown in Fig. 22, in which the screen is just visible from the back seats above the heads of the persons in front. Even these sheets need not be necessarily prepared with different moulds, but can be made by rolling the multiplier sheet (Fig. 17), in the direction of the lenticules, out of a multiplier sheet which is originally prepared for the smallest thickness $d$ in the screen. If by the rolling all dimensions at right angles to the sheet are reduced by the same factor, whilst the lateral dimensions remain unchanged, an aplanatic cylinder lens is changed into a lens which is still approximately aplanatic, only the focal length is increased by the same factor as the thickness is reduced. It may be advantageous in manufacture to have a series of multiplier sheets ready, so as to be able to combine out of these screens for cinemas of any dimensions, by pasting these on base plates of suitable thickness, and fitting them with suitable mirror arrays. A few sets of mirror arrays will be suitable for all cinemas, if the final adjustment is made by the curvature radius R, the inclination $\mu$ and the prismatic front sheet, of which it will be also preferable to have a graded series.

It may be noted that all screens according to the invention admit also the projection of flat pictures. If used with ordinary films they have the advantage over the usual diffusing screens that the film need not be focussed on the screen itself, but can appear without loss of definition before or behind the screen surface.

What I claim as new and desire to secure by Letters Patent of the United States is:

1. In a system for producing pictures in stereoscopic relief in a cinema theatre a front projection viewing screen comprising a transparent base plate fitted on its front side with an array of equally spaced vertical cylindrical lenticules which have focal surfaces at least approximately coinciding with the rear face of said plate, means at said rear face for diffuse reflection of elemental beams incident from the projector both in horizontal and in vertical direction, and in front of said plate at least one array of plane mirrors, vertically spaced, each mirror having the shape of a horizontally elongated strip, the array being arranged in the manner of a Venetian blind.

2. In a system for producing pictures in stereoscopic relief in a cinema theatre a front projection viewing screen comprising a transparent base plate fitted on its front side with an array of equally spaced vertical cylindrical lenticules which have focal surfaces at least approximately coinciding with the rear face of said plate, means at said rear face for diffuse reflection of elemental beams incident from the projector both in horizontal and in vertical direction, and in front of said plate at least one array of narrow gaps in transparent material, each gap being bounded by two plane surfaces parallel and closely spaced to one another, each bounding surface having the shape of a horizontally elongated strip, said gaps being vertically spaced in relation to one another and arranged in the manner of a Venetian blind.

3. In a system for producing pictures in stereoscopic relief in a cinema theatre a front projection viewing screen according to claim 2, comprising at least two sheets of transparent material with the same refractive index, with saw tooth profiles the edges of which are running horizontally, said saw tooth profiles having complementary shape, and are joined together so as to form between them at least one array of plane parallel gaps arranged in the manner of a Venetian blind.

4. In a system for producing pictures in stereoscopic relief in a cinema theatre a front projection viewing screen according to claim 2, in which the transparent material of the base plate has a higher refractive index than the transparent material containing the plane parallel gaps arranged in the manner of a Venetian blind.

5. In a system for producing pictures in stereoscopic relief in a cinema theatre a front projection viewing screen according to claim 2, in which the vertical cylindrical lenticules consist of transparent material which itself is immersed in a transparent material which has a refractive index higher than the transparent material containing the plane parallel gaps arranged in the manner of a Venetian blind.

6. In a system for producing pictures in stereoscopic relief in a cinema theatre a front projection viewing screen comprising a transparent base plate fitted on its front side with an array of equally spaced vertical cylindrical lenticules which have focal surfaces at least approximately coinciding with the rear face of said plate, means at said rear face for diffuse reflection of elemental beams of light incident from the projector both horizontally and vertically, said plate being wedge shaped, with the thin end of the wedge in the line in which the screen is intersected by an audience plane, and in front of said base plate at least one array of strip shaped plane reflecting elements arranged in the manner of a Venetian blind.

7. In a system for producing pictures in stereoscopic relief in a cinema theatre a front projection viewing screen comprising a transparent base plate fitted on its front side with an array of equally spaced vertical cylindrical lenticules which have focal surfaces at least approximately coinciding with the rear face of said plate, means for diffuse reflection of elemental beams incident from the projector on said rear face in horizontal and in vertical direction, and in front of said base plate at least one array of strip shaped plane reflecting elements arranged in the manner of a Venetian blind, both the lenticules and said reflecting elements being embedded in sheets of transparent material, all said sheets being joined together by means of transparent adhesives so that they are in optical contact with one another.

8. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, means for diffuse reflection of elemental beams incident from the projector in horizontal and in vertical direction at said rear face, and in front of said base plate at least one array of strip shaped plane reflecting elements arranged in the manner of a Venetian blind, both the lenticules and said reflecting elements being embedded in sheets of transparent material, all said sheets being joined together by means of transparent adhesives, and at least one interface between two sheets of different refractive indices being provided with a layer of transition of at least several wavelengths thickness, in which layer the refractive index changes in a continuous manner from the value corresponding to one sheet to the value corresponding to the other.

9. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, means at said rear face for diffuse reflection of elemental beams incident from the projector in horizontal and in vertical direction, and in front of said base plate at least one array of strip shaped plane reflecting elements arranged in the manner of a Venetian blind, both the lenticules and said reflecting elements being embedded in sheets of transparent material, said projection screen being curved around a horizontal axis and tilted against the vertical in such a way that no light from the projector reflected on the front face of said screen may be visible from any point in the area of the theatre in which observers are seated.

10. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, means at said rear face for diffuse reflection of elemental beams incident from the projector in horizontal and in vertical direction, in front of said base plate at least one array of strip shaped plane reflecting elements arranged in the manner of a Venetian blind, both the lenticules and said reflecting elements being embedded in sheets of transparent material, and in front of the elements as described a transparent sheet with a saw tooth profile, the edges running horizontally, the facets of said sheet having such angles against the horizontal that no light coming from the projector and reflected on said facets shall fall into the area of the theatre in which observers are seated.

11. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, said rear face being fitted with horizontally running ridges of approximately prismatic shape, at least one face of said ridges being fitted with toroidal impressions and provided with a reflecting backing, the two curvatures of said toroidal reflecting surfaces being adapted so that the rays emerging from said screen fall at least approximately only into the area in which observers are seated.

12. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, said rear face being covered with a network of toroidal impressions without reflecting backing, adapted to disperse only light falling at said rear face at nearly grazing incidence by total reflection, whereas rays falling in nearer to the horizontal pass through said rear face without substantial reflection, the two curvatures of said toroidal impressions being adapted so that the rays emerging from said screen cover at least approximately only the area in which observers are seated.

13. In a system for producing pictures in stereoscopic relief in a cinema theatre, a front projection viewing screen according to claim 2, comprising at least two arrays of plane parallel gaps as described, the planes of the gaps in said two arrays including such angles with the horizontal and with one another that rays coming from the projector will pass through the gaps belonging to one array without any deflection and without substantial reflection, whereas they will be totally reflected on the gaps belonging to the other array, whereas for rays returning after reflection at the rear face of the base plate the parts of the two arrays are reversed.

14. In a system for producing pictures in stereoscopic relief in a cinema theatre with pit and gallery, a front projection viewing screen according to claim 2, with at least two arrays of plane parallel gaps as described arranged in front of one another, of which the one nearer to the base plate produces images of the projector aperture in the plane of the gallery, whereas the one nearer to the front produces corresponding images in the plane of the pit, the gaps in said two arrays including angles with one another and with the horizontal so adapted that the emerging beam reflected on the rear array will be split by the front array which diverts by reflection rays within a certain angular fraction, whereas the rays which are not reflected on said frontal array traverse it without deflection and cover substantially the area in the gallery in which seats are arranged.

15. In a system for producing pictures in stereoscopic relief, in combination, in a cinema theatre with more than one audience plane a projector with a horizontal aperture width at least equal to the normal eye spacing but smaller than the smallest lateral spacing of two columns of seats in the audience, a front projection viewing screen comprising means for producing a multiplicity of substantially vertical and equally spaced band shaped images of the projector aperture, the spacing of said bands being equal to the smallest lateral spacing of two columns of seats in the audience, whereas the width of each of said image bands is equal to the width of the projector aperture, means for transforming said substantially vertical image bands into bands of equal width and spacing contained in at least two planes which intersect in a horizontal line vertically below the screen and coincide with at least two of the audience planes in said theatre.

16. In a system for producing pictures in stereoscopic relief in a cinema theatre, a front projection viewing screen comprising a transparent base plate fitted on its front side with an array of equally spaced vertical cylindrical lenticules which have focal surfaces at least approximately coinciding with the rear face of said plate, means being provided at said rear face for diffuse reflection of elemental beams incident from the projector both in horizontal and in vertical direction, so that each lenticule produces on said diffusing rear face one elemental strip shaped image of the projector aperture, the thickness of said base plate being a multiple of the spacing of the lenticules at least equal to the number of seats in a row of the theatre, to produce a plurality of equally spaced vertical strip shaped aerial images of the projector, at least of the number of seats in a row of the theatre, each lenticule co-operating with at least the said number of elemental projector images at the diffusing rear face, and each of the said elemental projector images co-operating with at least the said number of lenticules in forming said plurality of aerial images of the projector aperture.

17. In a system for producing pictures in stereoscopic relief, in combination, in a cinema theatre in which the seats at least in alternating rows are arranged in columns of equal lateral spacing, a projector with a horizontal aperture width at least equal to the normal eye spacing but smaller than the smallest lateral spacing of two columns of seats in the audience, and a front projection viewing screen comprising a transparent base plate fitted on its front side with an array of equally spaced vertical cylindrical lenticules which have focal surfaces at least approximately coinciding with the rear face of said plate, the thickness of which is a multiple of the spacing of the lenticules, means being provided at said rear face for diffuse reflection, to produce a plurality of substantially vertical and laterally equally spaced band shaped images of the projector aperture, the spacing of said bands being equal to the smallest lateral spacing of two columns in the audience, whereas the width of each of said image bands is equal to the width of the projector aperture, and means for transforming said vertical images into a plane in which the eyes of observers in said cinema theatre are contained, each of said image bands registering with a column of seats.

18. In a system for producing pictures with stereoscopic relief, in combination, in a cinema theatre in which the seats at least in alternating rows are arranged in columns of equal lateral spacing, at least two projectors which may be used alternatingly for consecutive reels, each with a horizontal aperture width larger than the normal eye spacing but smaller than the smallest lateral spacing of two columns in said theatre, and having distances from one another of an integer multiple of said smallest lateral spacing, a front projection viewing screen comprising means for producing a multiplicity of substantially vertical and equally spaced band shaped images of the projector aperture, the spacing of said bands being equal to the smallest lateral spacing of two columns in the audience, whereas the width of each of said image bands is equal to the width of the projector apertures, and means for transforming said vertical images into a plane in which the eyes of observers in said cinema theatre are contained, each of said image bands registering with a column of seats irrespective of which projector is used.

DENNIS GABOR.